(12) United States Patent
McClure

(10) Patent No.: US 7,661,690 B2
(45) Date of Patent: Feb. 16, 2010

(54) MECHANICAL ADVANTAGE DRIVE SYSTEM FOR CYCLES

(76) Inventor: Brian Scott McClure, 1063 Lakemont Dr., Pittsburgh, PA (US) 15243

( * ) Notice: Subject to any disclaimer, the term of this patent is extended or adjusted under 35 U.S.C. 154(b) by 478 days.

(21) Appl. No.: 11/361,496

(22) Filed: Feb. 23, 2006

(65) Prior Publication Data

US 2007/0194552 A1      Aug. 23, 2007

(51) Int. Cl.
    *B62K 5/02*   (2006.01)
    *B62M 1/02*   (2006.01)
(52) U.S. Cl. .................. 280/259; 280/266; 280/282
(58) Field of Classification Search ............ 280/259, 280/260, 261, 266, 267, 282, 235, 268, 269
    See application file for complete search history.

(56) References Cited

U.S. PATENT DOCUMENTS

| | | | |
|---|---|---|---|
| 450,484 A * | 4/1891 | Duval | 301/6.5 |
| 519,557 A * | 5/1894 | Sheldon | 280/223 |
| 776,357 A * | 11/1904 | Shields | 280/231 |
| 846,033 A * | 3/1907 | Kidney | 280/261 |
| 1,176,654 A * | 3/1916 | Collins | 280/1.204 |
| 3,311,388 A * | 3/1967 | Ryan et al. | 280/269 |
| 3,466,059 A * | 9/1969 | Kiernan | 280/261 |
| 3,921,467 A | 11/1975 | Matsuura | |
| 3,964,563 A | 6/1976 | Allen | |
| 4,169,609 A | 10/1979 | Zampedro | |
| 4,198,072 A | 4/1980 | Hopkins | |
| 4,445,701 A | 5/1984 | Stroud | |
| 4,502,705 A | 3/1985 | Weaver | |
| 4,548,421 A * | 10/1985 | Wiener | 280/282 |
| 4,572,535 A * | 2/1986 | Stewart et al. | 280/282 |
| RE32,681 E * | 5/1988 | Randolph et al. | 280/261 |
| 4,789,173 A * | 12/1988 | Lofgren et al. | 280/288.1 |
| 4,953,882 A | 9/1990 | Craig, Jr. | |
| 4,993,733 A | 2/1991 | Eilers | |
| 5,263,732 A | 11/1993 | Harmeyer | |

(Continued)

OTHER PUBLICATIONS

J&B Importers, Incorporated, Miami Sun Trike Assembly Manual, Revised Mar. 1998, pp. 1-16, J&B Importers-Wholesale Distributors, Florida, USA.

Schlumpf Innovations, Technical Data, [online], [originally accessed as early as Aug. 2004; retrieved Aug. 22, 2006] Retrieved from the Schlumpf Innovations website using Internet <URL: http://www.schlumpf.ch/sd_engl.htm>, 3 pages, Switzerland.

(Continued)

*Primary Examiner*—Anne Marie M Boehler
(74) *Attorney, Agent, or Firm*—Dorsey & Whitney LLP

(57) ABSTRACT

A cycle with a mechanical advantage drive and leaning steering system comprises a frame with at least one wheel rotationally attached to the frame. A drive rim is attached to the wheel adjacent to the outer circumference of the wheel. A pulley is rotationally attached to the frame. A belt is trained around and engages both the pulley and the drive rim. Because the belt is positioned at the outer circumference of the wheel a mechanical advantage is created that significantly reduces the amount of force required on the belt to propel the cycle. The cycle may be steered via the rotation of the rider's body on a seat. This rotation translates to rotation of a front portion of the frame with respect to the a rear portion of the frame about a pivoting interface portion, thereby causing the cycle to turn.

8 Claims, 10 Drawing Sheets

U.S. PATENT DOCUMENTS

| | | | |
|---|---|---|---|
| 5,303,942 A | | 4/1994 | Schlumpf |
| 5,354,084 A | * | 10/1994 | Lofgren et al. ............... 280/250 |
| 5,568,935 A | * | 10/1996 | Mason ....................... 280/282 |
| 5,609,071 A | | 3/1997 | Schlumpf |
| 5,685,553 A | | 11/1997 | Wilcox et al. |
| 6,161,854 A | | 12/2000 | Christini et al. |
| 6,161,855 A | | 12/2000 | Christini et al. |
| 6,182,991 B1 | | 2/2001 | Christini et al. |
| 6,419,254 B1 | | 7/2002 | Langen |
| 6,439,592 B1 | | 8/2002 | Christini et al. |
| 6,554,309 B2 | | 4/2003 | Thir |
| 6,572,130 B2 | * | 6/2003 | Greene et al. ............... 280/266 |

OTHER PUBLICATIONS

Dr. Israel Urieli, (Assoc. Prof. Mechanical Engineering, Russ College of Engineering and Technology at Ohio University), Toothed Belt Drives, [originally accessed as early as Aug. 2004; retrieved Aug. 21, 2006] Retrieved from the Ohio University website at <URL: http://www.ohio.ent.ohiou.edu/urieli/hpv/belt.html, 2 pages.

* cited by examiner

MECHANICAL ADVANTAGE DRIVE SYSTEM FOR CYCLES

BACKGROUND OF THE INVENTION

In many regions of the world, cycles, for example, bicycles or tricycles are still the predominant mode of transportation other than walking. Due to depressed economic conditions, automobiles and the fuel to run them are simply not within the budget of the average person. Cycles are used to carry loads including livestock, agricultural products, other wares (e.g., in baskets, panniers, on platforms, or in wagons or trailers pulled by the cycles), and even people as passengers (e.g., tricycle rickshaws). Further, even in wealthier regions of the world, the increased cost of fuel, traffic congestion, and limited parking may make cycling a desired mode of commuter transportation in densely populated areas. Cycles are also used heavily for exercise and recreation in more affluent regions as well.

Several forces resist the forward motion of a cycle, for example, a bicycle or a tricycle. A first force is gravity when a rider propels a cycle up an incline. A second force is friction between the cycle and the surface along which the cycle travels. A third force is wind resistance created by the forward motion of the cycle, blowing wind, or both. Improvements to cycling technology that reduce the effort of a rider to propel a cycle would likely significantly benefit riders of cycles in any of the potential uses described above.

The information included in this Background section of the specification, including any references cited herein and any description or discussion thereof, is included for technical reference purposes only and is not to be regarded subject matter by which the scope of the invention is to be bound.

SUMMARY

The mechanical advantage drive system for cycles disclosed herein provides an ability to haul a load of greater mass. This provides an opportunity to add fairings or other aerodynamic structures to the cycle because the additional force needed to propel the cycle with the added weight of the fairings is reduced by the mechanical advantage of the drive system. If the cycle were equipped with fairings, the force of wind resistance against the cycle and rider could also be reduced, again reducing the force required by the rider to propel the cycle.

In one implementation, a cycle with a mechanical advantage drive system comprises a frame with at least one wheel rotationally attached to the frame. A drive mm is attached to the wheel adjacent to the outer circumference of the wheel. A pulley is rotationally attached to the frame. A belt is trained around and engages both the pulley and the drive rim. A crank arm is rotationally attached to the frame and adapted to drive the pulley as the rider pedals to turn the crank arm. In this manner the belt drives the wheel when the crank arm drives the pulley.

In another implementation, a bicycle with a mechanical advantage drive system comprises a frame with front and rear wheels rotationally attached to the frame. A drive rim is attached to the rear wheel adjacent to an outer circumference of the rear wheel. A pulley is rotationally attached to the frame and positioned behind the rear wheel. A belt is trained around and engages both the pulley and the drive rim. A crank arm is rotationally attached to the frame and adapted to drive the pulley as the rider pedals to turn the crank arm. In this manner the belt drives the rear wheel when the crank arm drives the pulley. The pulley system may be used in conjunction with a standard drive system for the bicycle wherein a chain ring drives a sprocket or cassette on the hub of the rear wheel. Through the use of a freewheel in both the hub of the rear wheel and in the mounting of the pulley to the frame, the gearing of the bicycle can be designed to allow the mechanical advantage drive system of the pulley to overtake the standard drive system when the standard drive system is in its lowest gear.

In a further implementation, a tricycle with a mechanical advantage drive system comprises a frame with a front wheel and two rear wheels rotationally attached to the frame. A drive rim is attached to the front wheel adjacent to an outer circumference of the front wheel. A pulley is rotationally attached to the frame and positioned behind the front wheel. A belt is trained around and engages both the pulley and the drive rim. A crank arm is rotationally attached to the frame and adapted to drive the pulley as the rider pedals to turn the crank arm. In this manner the belt drives the rear wheel when the crank arm drives the pulley. Through the use of a freewheel in both the hub of the front wheel and in the mounting of the pulley to the frame, the gearing of the tricycle can be designed to allow the mechanical advantage drive system of the pulley to overtake the primary drive system when the primary drive system is in its lowest gear.

The frame of the tricycle may be composed of a front portion, and interface portion, and a rear portion. The front portion is attached to the front wheel and seat of the tricycle. The rear portion is attached to the rear wheels and the handlebars of the tricycle. The interface portion rotationally attaches the front portion and rear portions together. Rotational motion of a user's body and thus the seat with respect to the handlebars may result in a corresponding rotational motion of the front wheel with respect to the rear wheels of the tricycle causing turning of the tricycle.

Further aiding turning of the tricycle, the rear portion may comprise hinged forks attached to each rear wheel. The handlebars are attached to each front fork and may cause either fork to angle downwardly at a hinge when pressed upon by the corresponding side of the handlebars. A restraint chain may connect each fork together so that downward angular movement of one fork translates to upward angular movement of the opposite fork. In effect, a user may cause the tricycle to lean in the direction of a turn by pressing down on the handlebars on the outside of a turn. The rear wheel on the outside may move downwardly while the rear wheel on the inside of the turn may move upwardly causing the tricycle to lean into a turn.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Other features, details, utilities, and advantages of the claimed subject matter will be apparent from the following more particular written Detailed Description of various embodiments and implementations as further illustrated in the accompanying drawings and defined in the appended claims.

DETAILED DESCRIPTION OF THE INVENTION

Figure 1:
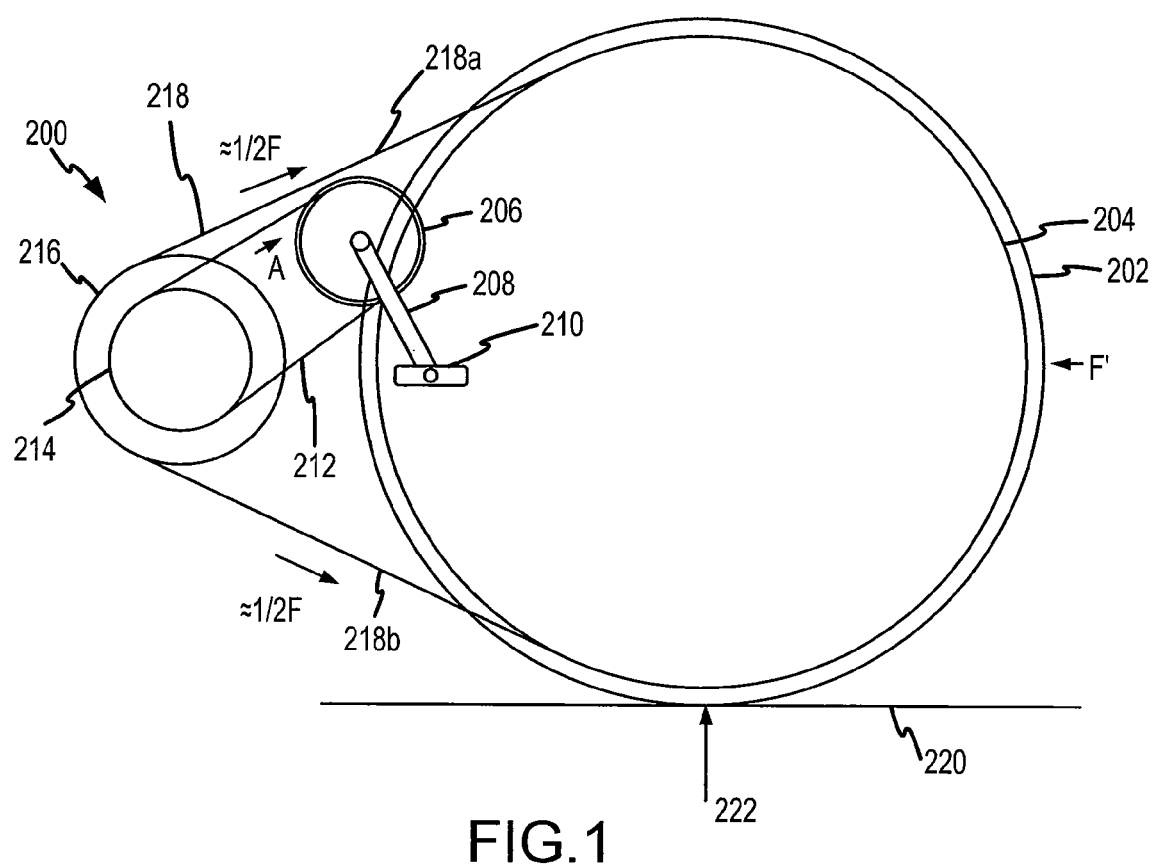
FIG. 1 is a schematic diagram of the concept of mechanical advantage of a pulley applied to a bicycle wheel.

A mechanical advantage is discussed herein in connection with a cycle, either a bicycle or a tricycle as described herein (although the concept could be translated to any form of wheeled vehicle with any number of wheels). As shown in FIG. 1, a wheel 202 of a cycle 200 is in contact with a surface 220, for example, the ground or a road. (Note that only a single wheel and drive system of the cycle 200 are shown in FIG. 1 for clarity and simplicity.) As with most human powered cycles, a chain ring 206 is rotated by a rider whose feet and legs push pedals 210 attached to the chain ring 206 via crank arms 208 in a circular motion.

In the implementation of FIG. 1, the chain ring 206 drives a transfer ring 214 via a chain 212 as opposed to driving the hub of the wheel, which is the normal operation of a cycle. The transfer ring 214 is fixed to a pulley 216, thereby transferring the rotational motion imparted by the rider on the chain ring 206 to the pulley 216. The pulley 216 in turn drives the wheel 202 via a belt 218 that engages a drive rim 204 adjacent the circumference of the wheel 202.

As depicted in FIG. 1, the cycle 200 is opposed by a combined force F' of gravity and friction between the cycle 200 and the surface 220 that impedes the forward motion of the cycle 200. At any given time, either at rest or in motion, the wheel 202 of the cycle 200 is in constant contact with the surface 220 at contact point 222.

The force exerted by a rider on the pedals 210 is translated into a linear motion of the chain 212 in a generally forward direction as indicted by the arrow A. The forward linear motion of the chain 212 is further translated into generally forward linear motion of the belt 218 by the pulley 216.

In FIG. 1 the crank arm 208 and pedal 210 are depicted as attached to a chain ring 206 which in turn drives the pulley 216 via the chain 212. This arrangement mimics the arrangement of components on a traditional bicycle for driving a rear wheel. In particular, the use of a chain and chain ring on a bicycle allow the pedals to be conveniently positioned for pushing by the rider while driving the rear wheel while providing an ergonomically efficient position for the rider, generally balanced on the frame between the front and rear wheels. The chain and chain ring further provide an ability to shift between multiple gears using sprocket cassettes and derailleur configurations.

However, it should be apparent in FIG. 1 that the same mechanical advantage could be achieved in driving the wheel 202 if the crank arms were directly driving the pulley 216. In such a configuration, the front wheel of a cycle may be driven with or without linkage between the crank arms and an intermediate chain ring and chain. Further, the use of components such as a Speed Drive® (Schlumpf Innovations, Switzerland), an epicyclic gear system built into the crank set, in a hub of the pulley may allow for direct gearing alternatives when driving the pulley directly with the crank arms.

The diameter of the chain ring 206 may need to be larger than a chain ring of a normal bicycle. The diameter of the chain ring 206 is related to the diameters of the drive rim 204 on the wheel 202 and the pulley 216. Because the diameter of the pulley 216 is less than the diameter of the drive rim 204 and both are connected by the belt 218, the diameter of the chain ring 206 must be longer than on a normal bicycle to compensate. Another option to avoid a diameter increase in the chain ring 206 is to incorporate a Speed Drive in the crank set as described to provide the needed gearing.

Figure 2:
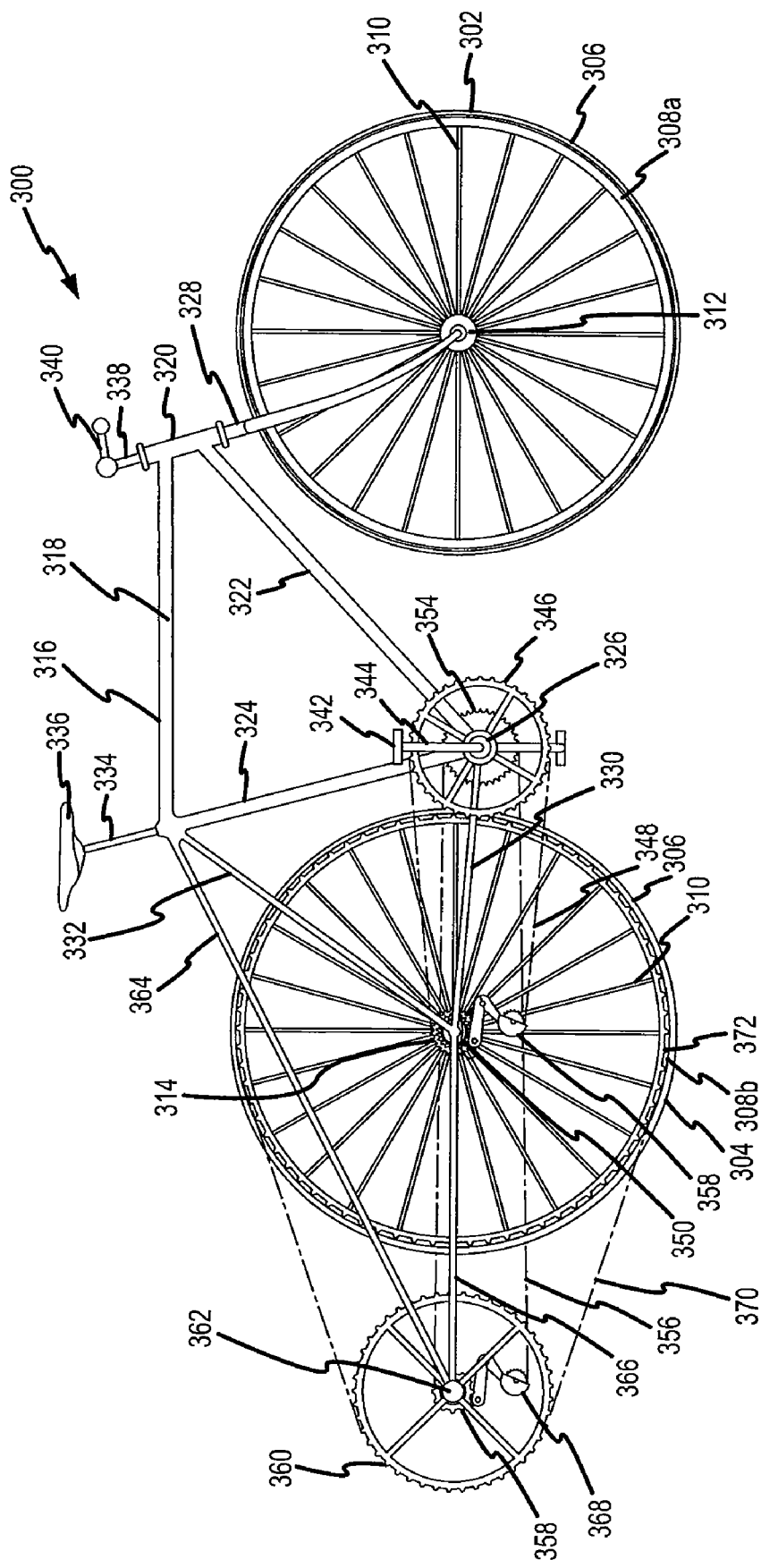
FIG. 2 is a right elevation view of a rear wheel drive bicycle implementing a mechanical advantage pulley drive system.

The mechanical advantage imparted to a cycle as depicted in FIG. 1 is implemented in the form of a bicycle 300 as depicted in FIG. 2. The bicycle 300 is generally of typical construction including a front wheel 302 and a rear wheel 304 attached to a frame 316. Both the front wheel 302 and the rear wheel 304 are constructed of a rim 308a, 308b that supports a tire 306. Each rim 308a, 308b is attached to a respective hub 312, 314 in the center of the wheels 302, 304 by a plurality of spokes 310. The rear hub 314 generally includes a freewheel assembly to allow the bicycle 300 to coast when the rider is not pedaling or the bicycle 300 is moving faster than the rider can pedal.

The frame 316 primarily comprises a top tube 318, a head tube 320, a down tube 322, a seat tube 324, and a bottom bracket 326. The top tube 318 and the down tube 322 are both joined at one end to the head tube 320. The opposite end of the top tube 318 is joined to one end of the seat tube 324. The opposite end of the seat tube 324 is with the bottom bracket 326 as is the second end of the down tube 322. This embodiment of the frame 316 as depicted is typical of most standard bicycles. However, it should be understood that the mechanical advantage drive system described herein may be implemented with any frame design or structure, for example, fully suspended mountain bike frames and other advanced frame designs.

A front fork 328 extends from the head tube 320 on each side of the front wheel 302 where a fork dropout (not shown) in the front fork 328 attaches to an axle (not shown) extending from the front hub 312. A chain stay 330 extends rearward from the bottom bracket 326 on each side of the rear wheel 304 to the rear hub 314. Similarly, a seat stay 332 extends rearward from the junction of the top tube 318 and the seat tube 324 on each side of the rear wheel 314 and joins with the chain stay 330 at the rear hub. The junction of the chain stay 330 and the seat stay 332 form a rear dropout (not shown) that attaches to an axle 374 (not shown in FIG. 2; see FIG. 3) extending from the rear hub 314.

Note that the drawings herein should be considered schematic and thus some of the detail of cycle construction is not depicted for purposes of clarity, although such details are well known in the art of cycle design. For example, although braking systems are provided on most cycles and would be incorporated into each embodiment of the cycles described herein, a braking system is not depicted to allow for a clearer depiction of the features of a mechanical advantage drive system. Similarly, gear shift levers, cables, and some derailleurs, although contemplated in the design and operation of the cycles described herein, are not depicted to provide additional clarity in the depiction of other features of the cycles. The inclusion of such additional components and features are well known and it is well within the ordinary skill of cycle designers and mechanics to add such additional components to the cycles described herein.

A seat post 334 extends upward from the junction of the top tube 318 and the seat tube 324 and supports a seat 336. The seat post 334 also extends within the seat tube 324 to allow for adjustment of the height of the seat 336.

A stem 338 extends upward from the head tube 320 to support handlebars 340. The stem 338 also extends within the head tube 320 to allow for adjustment of the height of the handlebars 340. The stem 338 is attached to the front fork 328 and rotates within the head tube 320 to allow for steering of the bicycle 300.

The drive system of the bicycle 300 is, in part, typical and starts with a pair of pedals 342 attached to a pair of crank arms 344 that extend from the bottom bracket 326. The crank arms 344 are attached to each end of a spindle (not shown) that rotates within the bottom bracket 326. A chain ring 346 is attached to one side of the spindle (the right side as shown in FIG. 2) or directly to the crank arm 344 on the right side. The chain ring 346 thus rotates around the bottom bracket 326 as the rider pushes the pedals 342 in a circular motion.

The chain ring 346 has a plurality of teeth that extend from the circumference of the chain ring 346. The teeth engage a chain 348, which is a continuous loop that engages the rear hub 314 to drive the rear wheel 304. There may be more than one chain ring 346; two and three chain rings are commonly found on bicycles. A front derailleur (not shown) is generally used to transfer the chain 348 from one chain ring to another.

The chain 348 connects the chain ring 346 to one or more toothed sprockets on the rear hub 314. A plurality of sprockets, generally collected and attached together as a cassette 350, is attached to the rear hub 314 on the right side of the bicycle 300. The chain 348 engages the teeth of one sprocket in the cassette 350 at a time. The chain 348 is also threaded through a rear derailleur 352 that moves the chain 348 between the sprockets in the cassette 350.

The mechanical advantage drive system for the bicycle 300 is complementary to the standard drive system described above. To accommodate the additional components for the mechanical advantage drive system, the frame 316 is further composed of a pair of top pulley braces 364 that extend rearward on each side of the rear wheel 304 from the junction of the top tube 318 and the seat tube 324 and a pair of bottom pulley braces 366 that extend rearward on each side of the rear wheel 304 from the junction of the seat stay 332 and the chain stay 330. Each top pulley brace 364 is joined to a respective bottom pulley brace 366 at a point behind the rear wheel 304. A pulley hub 362 is positioned between the junction of the top and bottom pulley braces 364, 366 and is attached thereto.

Returning to the bottom bracket 326, the left side of the spindle, the left crank arm 344, or both may be attached to one or more transfer rings 354 that are also driven by the rider pushing the pedals. The transfer ring 354 is toothed about the circumference similar to the chain ring 346. A second chain 356 engages the transfer ring 354 and extends rearward along the left side of the rear wheel 304 as a continuous loop to drive the pulley hub 362. One or more sprockets forming a pulley cassette 358 may be attached to the left side of the pulley hub 362. The second chain 356 engages the sprockets of the pulley cassette 358 to turn the pulley hub 362. A pulley derailleur 368 may be attached to the junction of the top and bottom pulley braces 364, 366 and used to shift between the sprockets in the pulley cassette 358.

A pulley 360 is attached to the right side of the pulley hub 362. The pulley 360 may thus be turned by rotational transfer from the pulley cassette 358 through the pulley hub 362. The circumference of the pulley 360 is toothed to engage a belt 370 that is used to additionally drive the rear wheel 304. A drive rim 372 is attached to the rim 308b of the rear wheel 304. The drive rim 372 is toothed and engages the belt 370 driven by the pulley 360. The belt 370 may be made, for example, of reinforced rubber or polymer, toothed on one side for engaging the pulley 360 and drive rim 372 and flat on the other to minimize potential interference with the ground or collection of dirt and grit due to the close proximity of the belt 370 to the ground when traveling around the rear wheel 304. Alternatively, the belt 370 may be a chain or other continuous loop of material capable of engaging the pulley 360 and driving the drive rim 372.

Figure 3:
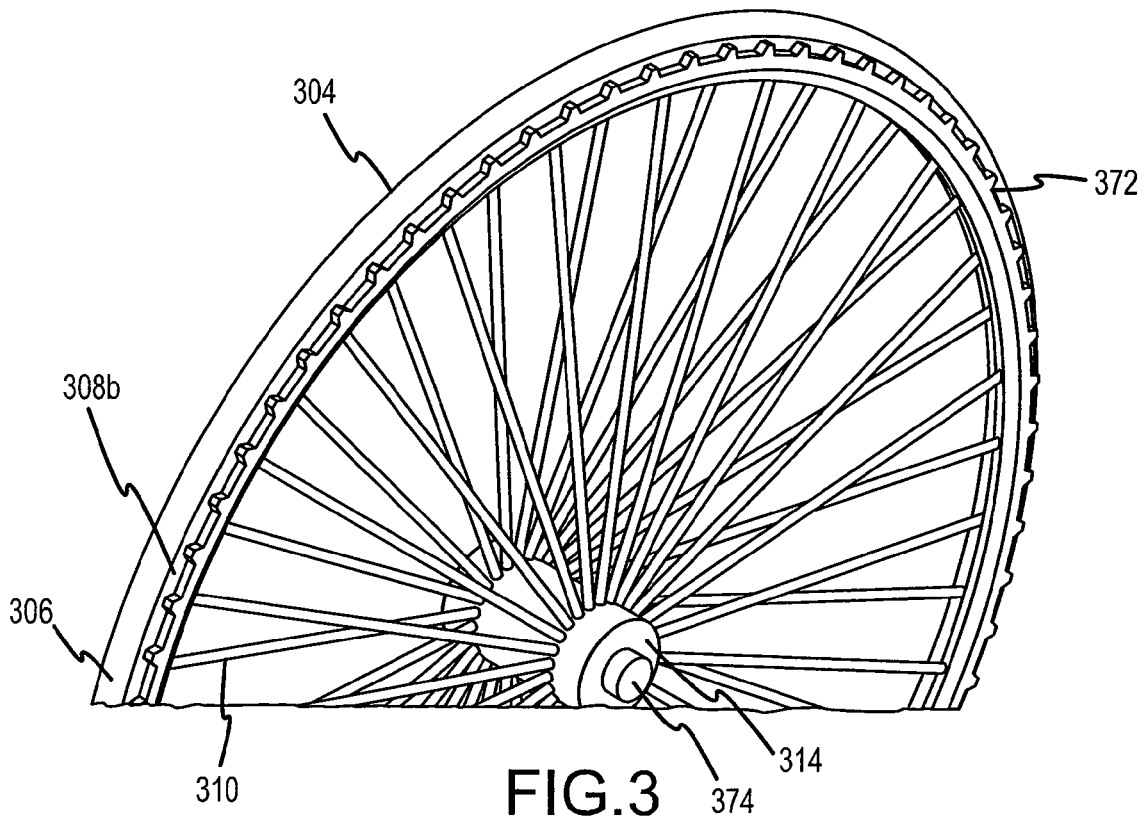
FIG. 3 is an isometric detail view of the front wheel and drive rim of the bicycle of FIG. 3.
Figure 4:
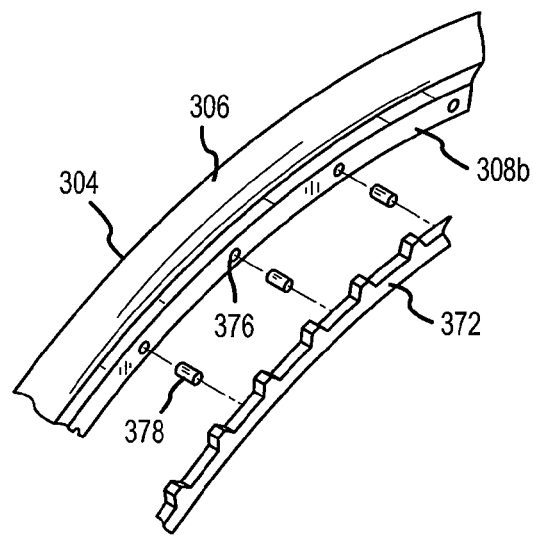
FIG. 4 is an exploded view of the front wheel and drive rim of FIG. 3.
Figure 5:
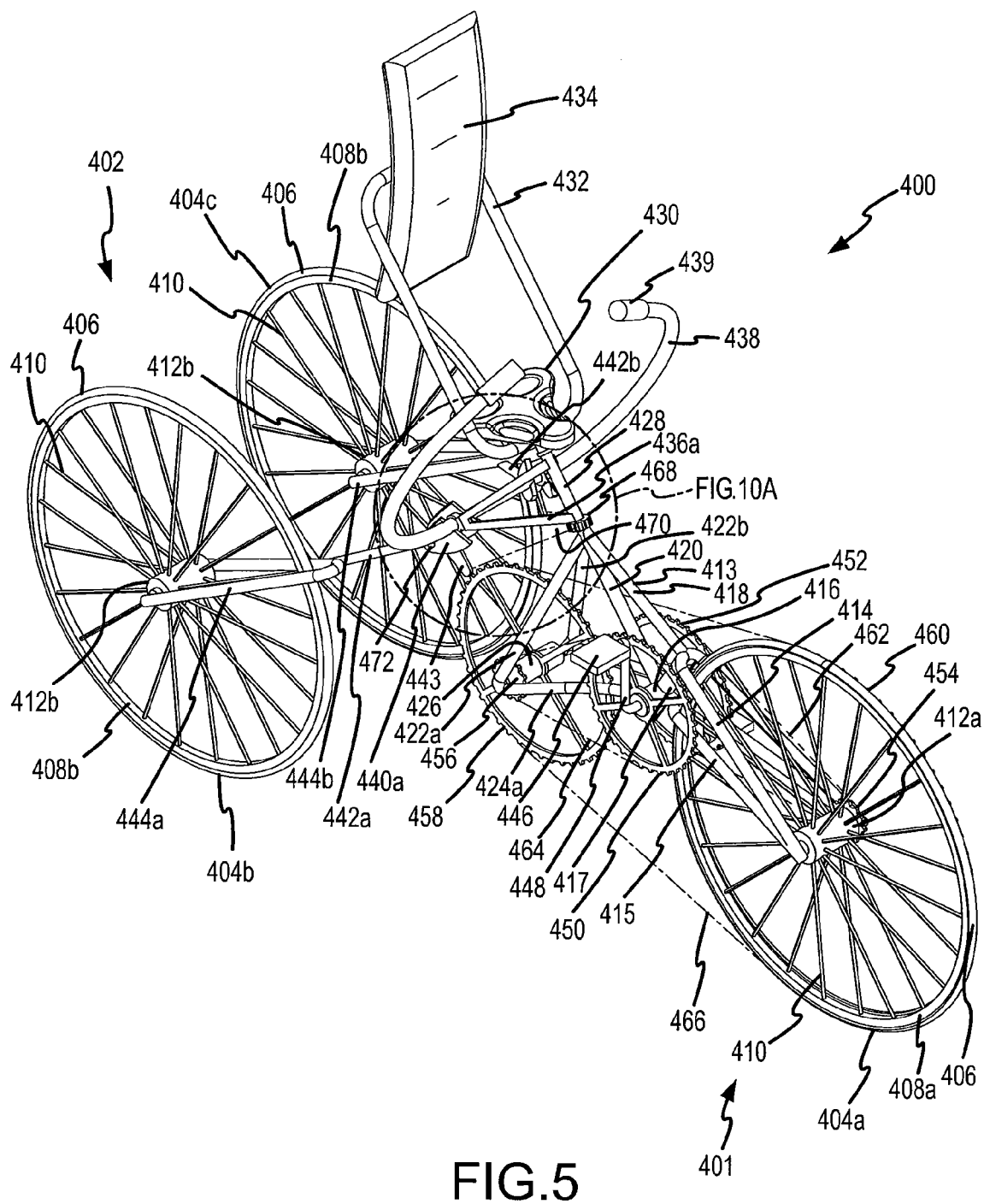
FIG. 5 is a front isometric view of a front wheel drive tricycle implementing a mechanical advantage pulley drive and leaning steering system.
Figure 6:
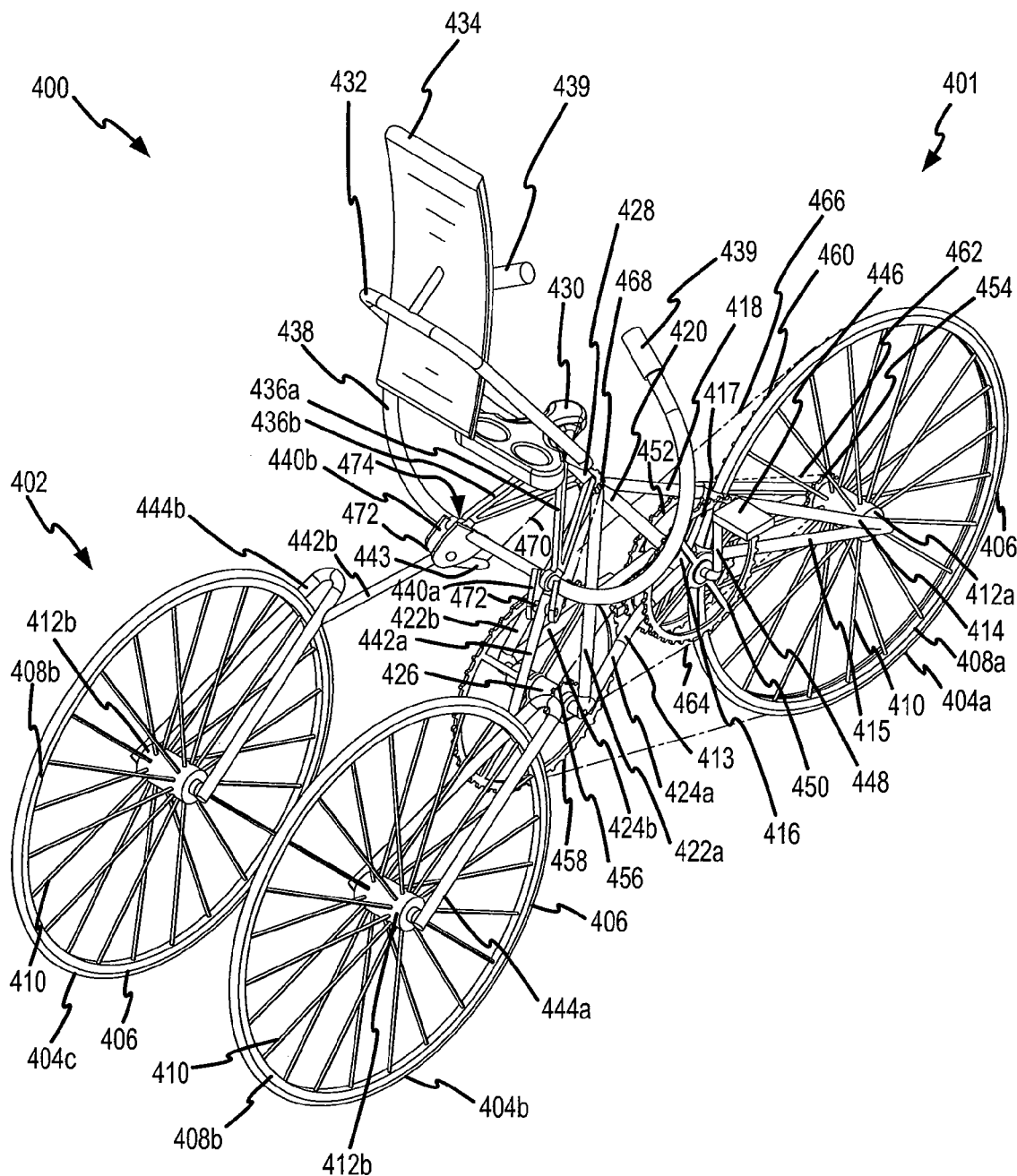
FIG. 6 is a rear isometric view of the front wheel drive tricycle of FIG. 6.
Figure 7:
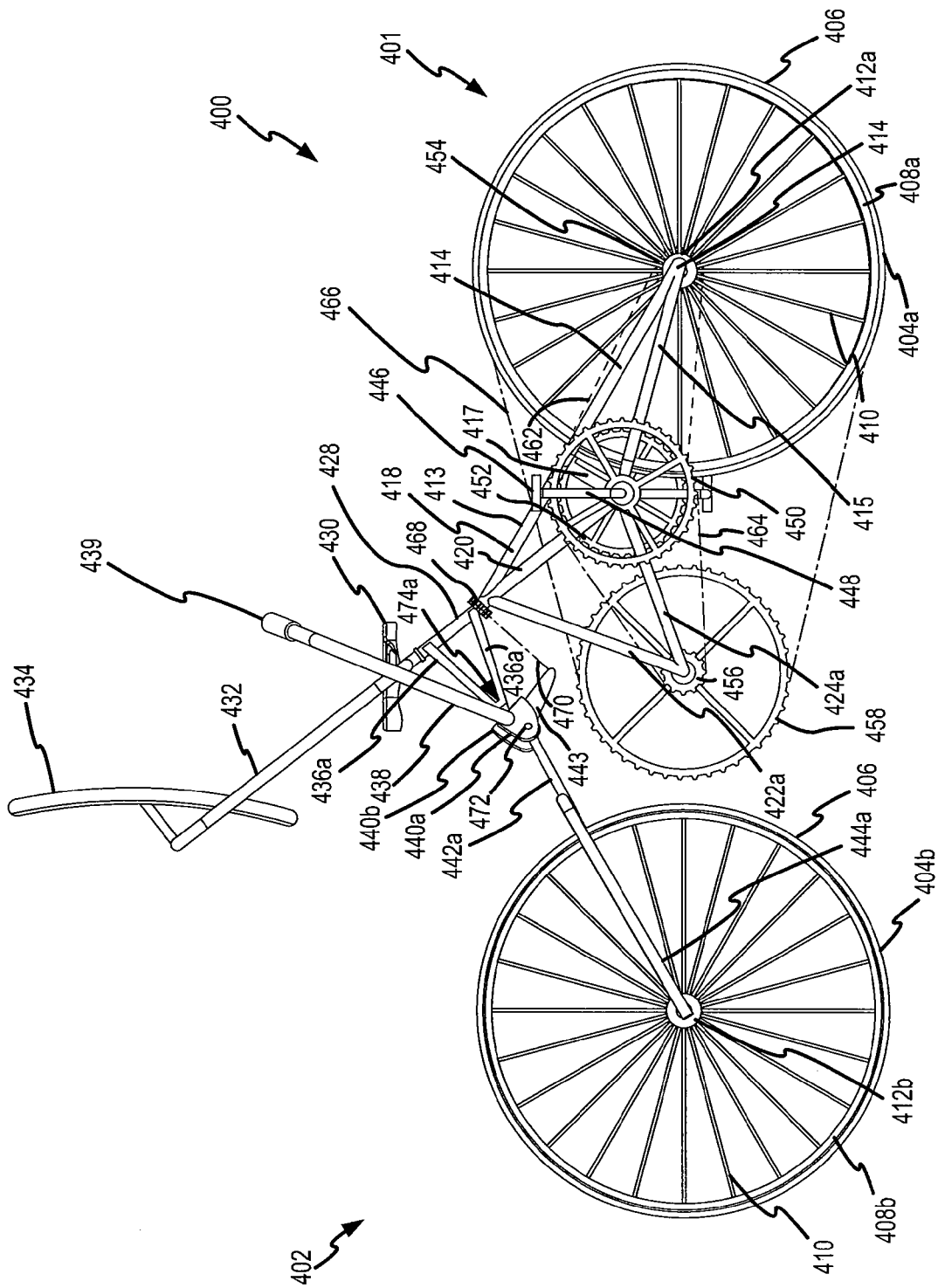
FIG. 7 is a right elevation view of the tricycle of FIG. 5.
Figure 8:
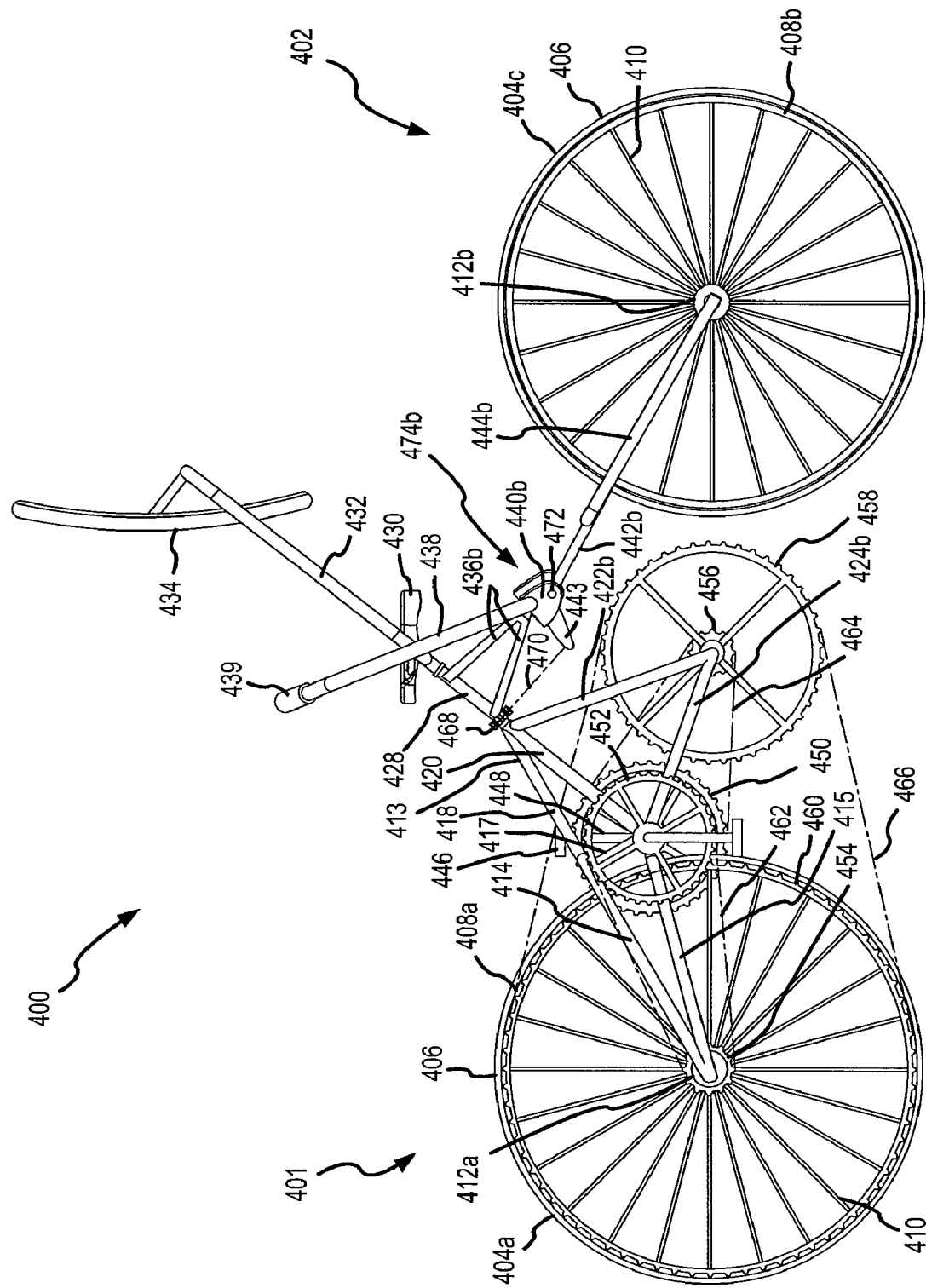
FIG. 8 is a left elevation view of the tricycle of FIG. 5.

FIGS. 3 and 4 depict the construction of the drive rim 372 in greater detail. The drive rim 372 may be attached to a sidewall of the rear rim 308b with a plurality of pins 378 inset into a plurality of respective apertures 376 in the sidewall of the rim 308b. The pins 378 may be spot welded or otherwise affixed to the apertures 376 in the rim 308b. The pins 378 provide a short separation distance between the drive rim 372 and the rim 308b to allow a measure of clearance between the belt 370 and the rear wheel 304. Additionally, although not depicted, the drive rim 372 may be supported by an additional set of spokes extending from the hub. In this configuration, the hub may be extended in length slightly on the side of the wheel of the drive rim 372 to provide space for attachment of the additional set of spokes.

The pulley hub 362 includes a freewheel allowing the pulley 360 to spin freely as the rear wheel 304 rotates the pulley 360 via the belt 370 faster than the gearing of the pulley cassette 362 is rotated by the pull of the second chain 356. The sprockets of the pulley cassette 358 are geared such that freewheel in the pulley hub 372 spins freely when all but the lowest gear combination of the cassette 350 on the rear wheel 304 and the chain rings 346 is engaged. The relationship between the gears of the cassette 350 and the pulley cassette 358 is chosen such that the pulley 360 engages the rear wheel 304 when the second chain 356 rotates the highest gear of the pulley cassette 358 at a faster speed than the chain 348 rotates the lowest gear of the cassette 350. When the pulley 360 overtakes the cassette 350 as the drive for the rear wheel 304, the freewheel in the rear hub 314 spins freely. The rear wheel 304 is at this point driven by the belt 370 through engagement with the drive rim 372.

The application of a mechanical advantage drive system to a cycle may be particularly advantageous to tricycles. In many parts of the world, tricycles are still often used for hauling loads or passengers and thus burdened by significant weight that the rider must push. By providing a drive system that significantly decreases the force necessary to propel the tricycle, the exertion required by a rider hauling a load is significantly decreased. Alternately, the rider may be able to increase the weight of the load he is able to carry.

An exemplary tricycle 400 implementation is depicted in FIGS. 5-9. The tricycle 400 has a front wheel 404a and two rear wheels 404b, 404c attached to a frame 413. Each of the wheels 404a, 404b, 404c comprises a hub 412a, 412b attached to a rim 408a, 408b, via a set of spokes 410. Tires 406 are mounted on each of the rims 408a, 408b.

A front portion 401 of the frame 413 is formed about a bottom bracket 416, a front down tube 418, a seat tube 420, a pair of rear down tubes 422a, 422b, and a pair of bottom tubes 424a, 424b. The front down tube 418 and the rear down tubes 422a, 422b are each attached at one end to an upper portion of the seat tube 420. The lower end of the seat tube 420 is fixed to the bottom bracket 416. The bottom tubes 424a, 424b are attached at a first end to the bottom bracket 416 and at a second end to the lower ends of the rear down tubes 422a, 422b. A pulley hub 426 rotates on an axle mounted between the junction of the bottom tubes 424a, 424b and the rear down tubes 422a, 422b.

The lower end of the front down tube 418 connects with an upper front fork 414. A lower front fork 415 is connected at a first end to the bottom bracket 416 and extends forward to join the upper front fork 414 and connect with and support an axle in the front hub 412a about which the front wheel 404a rotates. The junction of the front down tube 418 and the upper front fork 414 may further be supported by a fork strut 417 extending upward from the bottom bracket 416.

A head tube 428 interfaces with the seat tube 420 allowing the seat tube 420 to turn on a bearing interface (not shown) within the head tube 428. The head tube 428 in this implementation, although located in a nontraditional position, acts similar to a head tube in a bicycle to facilitate steering of the tricycle 400 as further described below. The seat tube 420 extends through the head tube 428 to support a seat 430. A seat post (not shown) may fit within the seat tube 420 to allow the height of the seat to be adjusted. A backrest bracket 432 may be fixed to either the bottom of the seat 430 or the top of the seat post to hold a backrest 434 above and behind the seat 430 to support the back of a rider.

A pair of angled handlebar brackets 436a, 436b is fixed to the head tube 428. The handlebar brackets 436a, 436b extend rearward at angles toward the right and left sides of the tricycle 400, respectively. In this implementation, the handlebar brackets 436a, 436b form a triangle with the head tube 428 such that the two open ends of the angle are fixed to the head tube 428 and the vertex of the angle is attached to a handlebar 438.

As depicted, the handlebar 438 is generally a partial oval shape and extends from under the seat 430 to curve up and over the lap of a rider when seated in the seat 430 from each side of the tricycle 400. In this configuration, the grips 439 of the handlebars 438 are available for easy grasping by the rider to steer the tricycle 400 and aid in the balance of the rider while on the tricycle 400. The head tube 428, handlebar 438, and handlebar brackets 436a, 436b function as the interface between the front portion 401 of the frame 413 and a rear portion 402 of the frame 413, connecting the rear wheels 404b, 404c to the rest of the tricycle 400.

Figure 9A:
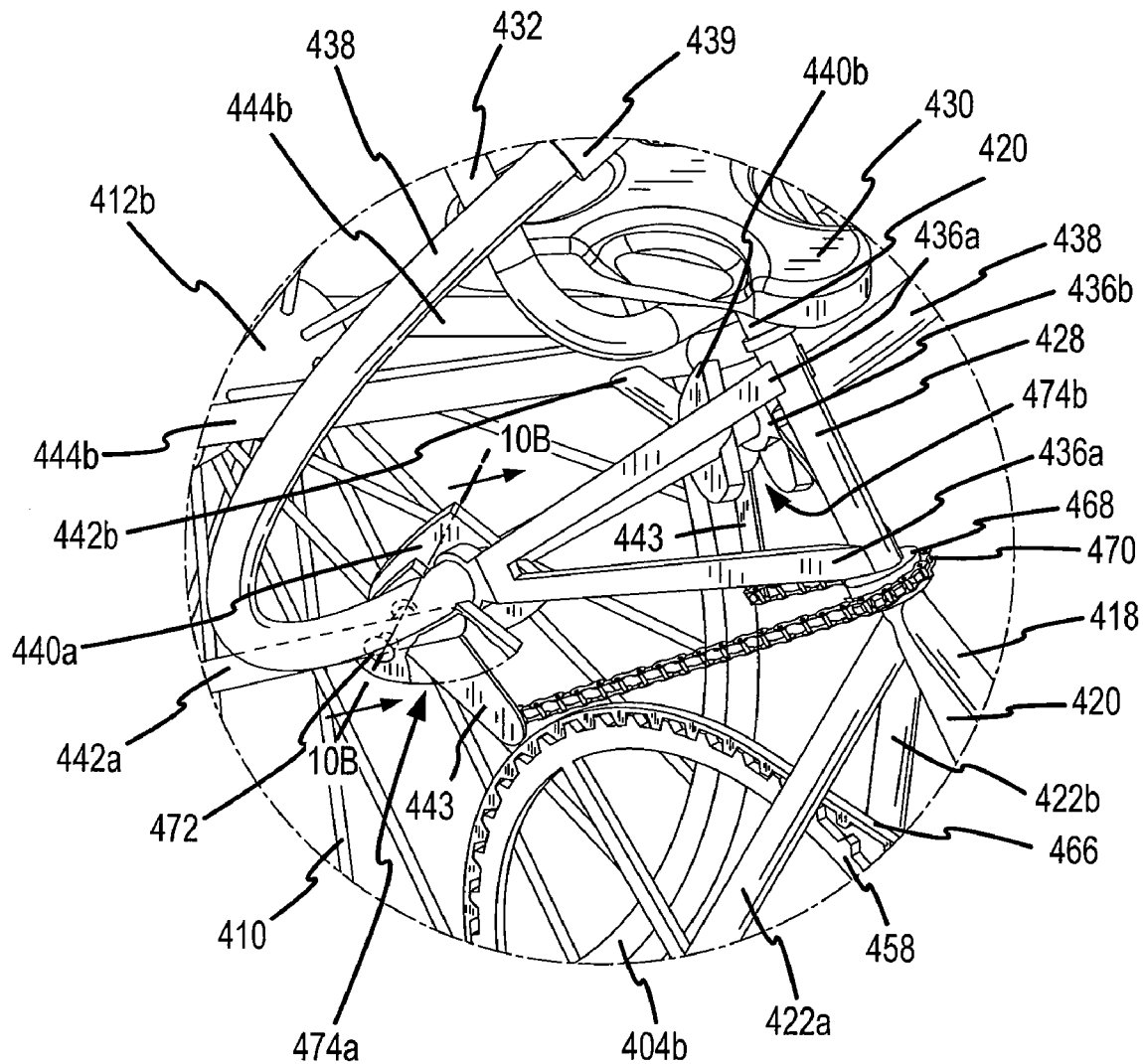
FIG. 9A is an enlarged view of the area indicated in FIG. 5 detailing a steering mechanism of the tricycle.
Figure 9B:
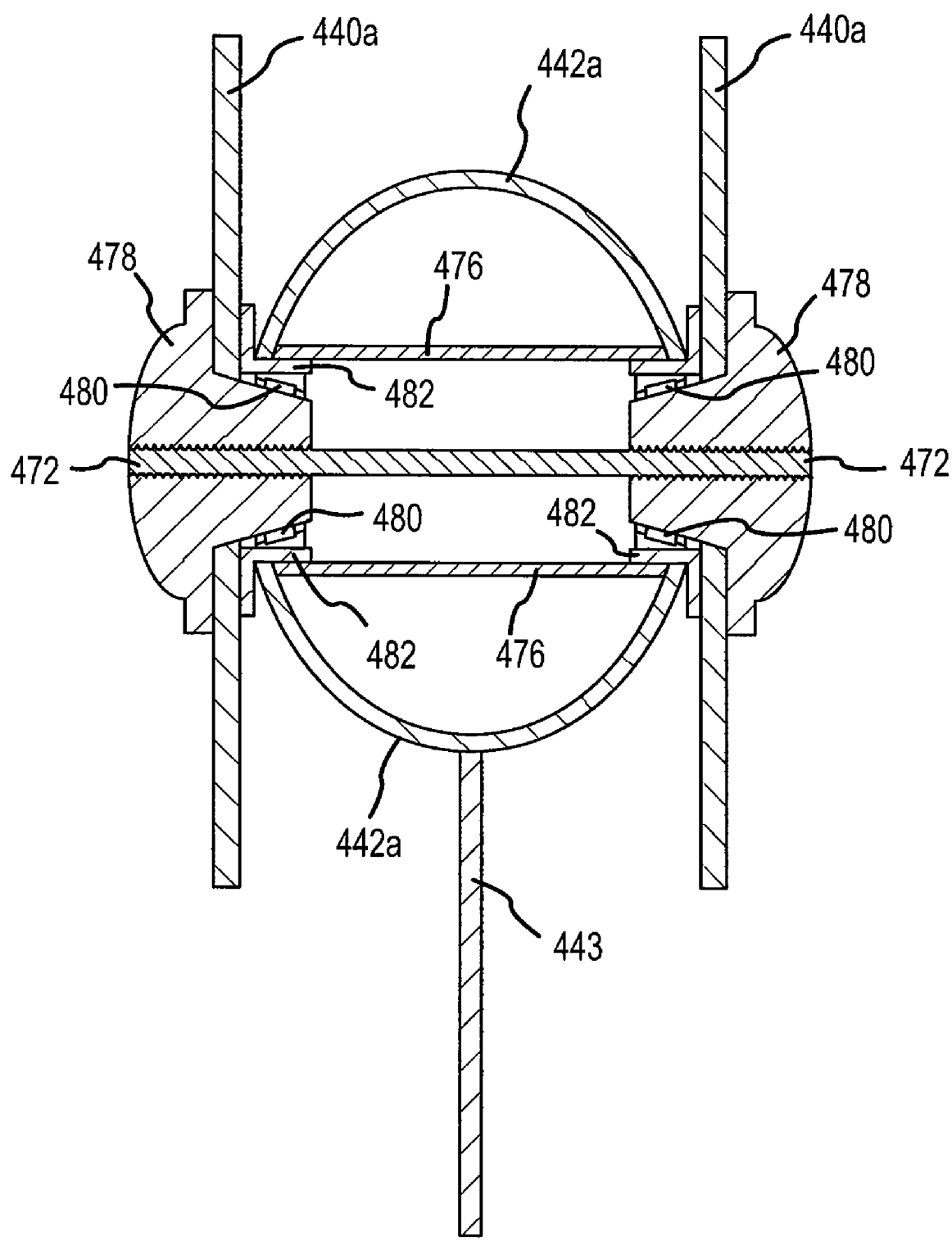
FIG. 9B is a cross section view in the plane indicated in FIG. 9A of a hinged attachment structure between the rear wheel forks and the handle bar of the tricycle of FIG. 5.
Figure 10:
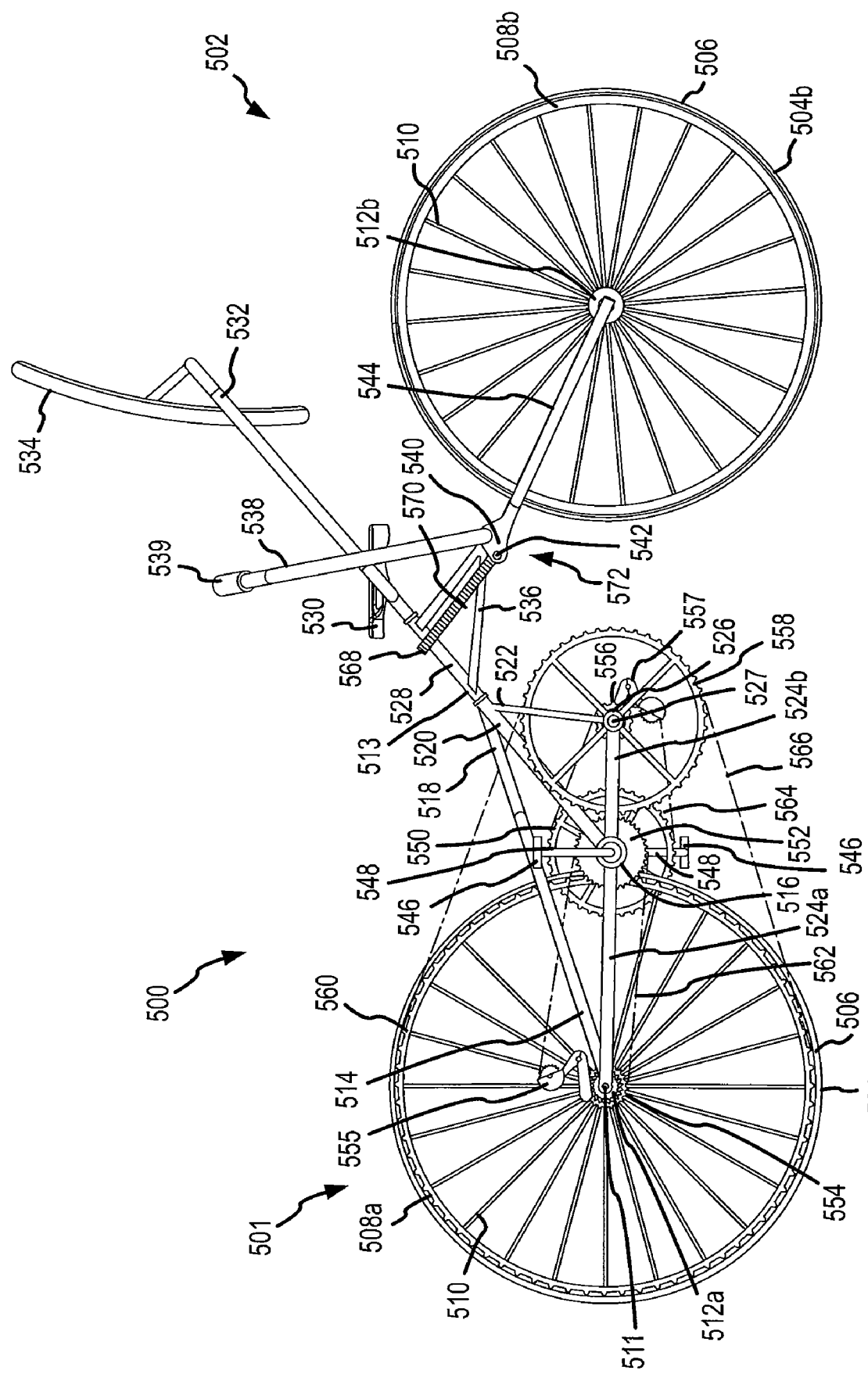
FIG. 10 is a left elevation view of a second embodiment of a front wheel drive tricycle implementing a mechanical advantage pulley drive and leaning steering system.

This interface also functions as the steering mechanism for the tricycle 400, which is shown in greater detail in FIGS. 9A and 9B. A pair of suspension brackets 440a, 440b is fixed to the handlebar 438 adjacent the handlebar brackets 436a, 436b, although the suspension brackets 440a, 440b may be located elsewhere on the handlebar 438. Each suspension bracket 440a, 440b comprises a pair of plates between which a hinge pin 472 is mounted. Two fork extensions 442a, 442b are mounted to a respective hinge pin 472 in each suspension bracket 440a, 440b and extend rearward from the handlebar 438.

The rear wheels 404b, 404c are mounted to respective rear forks 444a, 444b extending from each fork extension 442a, 442b. Each rear fork 444a, 444b attaches to the axle of each rear hub 412b. The rear wheels 404b, 404c are parallel and spaced evenly apart from a central vertical plane of the front portion 402 of the frame 413. A basket, platform, bed, palette, pannier, or other load carrying structure (not shown) may be mounted to the rear portion of the frame 402 between the rear wheels 404b, 404c to carry a load. A hitch (not shown) for attaching a trailer to pull a load may also or alternatively be mounted to the rear portion 402 of the frame 413.

An exemplary embodiment of one of the joints 474a is shown in FIG. 9B. A cross tube 476 is formed in the fork extension 442a through which the hinge pin 472 extends. The cross tube 476 is positioned adjacent through-holes in the suspension brackets 440a. A bushing 482 may seat in each end of the cross tube 476. A bolt 478 is inserted into each of the through-holes in the suspension brackets 440 and extends into the cross tube 476. The bolts 478 are fastened to each end of the hinge pin 472. The hinge pin 472 may be threaded on each end to allow bolts 478 with internal threaded cavities to be tightened to each end of the hinge pin 472. The outer walls of the bolts 478 that face the bushings 482 may be tapered for interface with a set of roller bearings 480 interposed between the bolts 478 and the bushings 482. The roller bearings 480 may be tapered to provide combined radial and thrust capacity for flexion of the joints 474a, 474b.

The front ends of the fork extensions 442a, 442b are also attached to respective ends of a restraint chain 470 that wraps around the seat tube 420 below the head tube 428. The front ends of the fork extensions 442a, 442b may have flanges 443 that extend downward (see FIG. 9A for greater detail). The restraint chain 470 may be attached to the lower ends of these flanges 443. A head sprocket 468 is mounted at the top of the seat tube 420 and interfaces with the restraint chain 470. The head sprocket 468 may be formed of a toothed sprocket mounted on a set of bearings that allow the head sprocket 468 to rotate around the seat tube 420. In practice, the head sprocket 468 travels minimally as it is constrained by its engagement with the restraint chain 470. However, the seat tube 420 may rotate within the head sprocket 468 on the bearings as the seat tube 420 and the front portion 401 of the frame 412 and front wheel are turned.

The restraint chain 470 also aids the hinge pins 472 in supporting the joints 474a, 474b between the front portion 401 and the rear portion 402 of the frame 413 and limits movement of the frame 413 about the hinge pins 472. The weight of the tricycle 400 and the rider thereon push the joints 474a, 474b at the hinge pins 472 against the restraint chain 470. The restraint chain 470 thus prevents the fork extensions 442a, 442b and rear wheels 404b, 404c from collapsing upward on the hinge pins 472 under the weight. A spring (not shown) may be used in combination with the hinge pins 472 to oppose an upward or downward collapse of the joints 474a, 474b about the hinge pins 472. The restraint chain 470 does allow for slight flex and movement of the hinge pins 472 during a turn as further explained below.

The greater the distance of the attachment point of the restraint chain 470 on the flanges 443 from the hinge pins 472, the greater the length of the restraint chain 470 that moves around the head sprocket 468 from one side of the tricycle 400 to the other. Stated another way, the greater the radius of the attachment point of the restraint chain 470 from the hinge pins 472 created by the flanges 443 results in a greater arc length of movement of the restraint chain 470 when the joints 474a, 474b flex about the hinge pins 272. The length of the flanges 443 and the location of the head sprocket 468 on the seat tube 420 may be coordinated to orient the restraint chain 470 in various positions to change the travel length of the restraint chain 270 and otherwise adjust the interaction between rotation of the seat tube 420 within the head tube 428 and the flexion of the joints 474a, 474b.

A traditional steering system in which the front wheel 404a is turned is thus augmented to accommodate the drive system of the tricycle 400, which drives the front wheel 404a. In the implementation shown in FIGS. 5-9B, the tricycle 400 is steered by a combination of turning the seat tube 420 within the head tube 428 and flexion of the joints 474a, 474b between the front portion 401 and rear portion 402 of the frame 413. The rider holds onto the handlebar 438 and, by rotating his body, the seat 430, attached seat post 420, and thus the entire front portion 401 of the frame 413 turn with respect to the head tube 428 and the attached rear portion 402 of the tricycle 400. Since the handlebar 438 and head tube 428 are attached to the rear wheels 404b, 404c, the handlebar 438 and head tube 428 remain in a fixed frame of reference while the rider and front portion 401 of the tricycle 400 rotate.

Additionally, when a rider turns the seat tube 420, the rider's weight is shifted to one side of the tricycle 400. In response to the shift in weight, the joint 474a, 474b between the front portion 401 and rear portion 402 of the frame 413 at the hinge pins 472 gives to favor the direction of steering indicated by the rider, additionally causing the tricycle 400 to lean into the turn. For example, if a rider desires to turn the tricycle 400 to the right by pushing on the left end of the handlebar 438 and pulling on the right end of the handlebar 438 to rotate the seat tube 420 within the head tube 428, an angle is created between the orientation of the front wheel 404a and the rear wheels 404b, 404c, which are all normally parallel.

The angle between the front portion 401 and the rear portion 402 of the tricycle 400 thus causes the rider thereon to lean to the right and the weight of the rider shifts to the right side of the tricycle 400. The weight of the rider on the right side causes the joint 474a to flex downward about the hinge pin 472 aiding in the turn. This downward flexion places tension on the restraint chain 470 and on the flange 443 of the fork extension 442b on the left side of the tricycle 400 causing the joint 474b to flex upward about the hinge pin 472. The opposing directions of flexion at the joints 474a, 474b also aids in turning the tricycle 400. The rider can thus effect the sharpness of a turn by the extent to which he shifts his weight.

The mechanical advantage drive system for the tricycle 400 is depicted in FIGS. 5-8. The drive system begins with a pair of pedals 446 attached to a pair of crank arms 448 that extend from the bottom bracket 416. The crank arms 448 are attached to each end of a spindle (not shown) that rotates within the bottom bracket 416. A chain ring 452 is attached to the left side of the spindle. The chain ring 452 thus rotates with the spindle in the bottom bracket 416 as the rider pushes the pedals 446 in a circular motion.

The chain ring 452 has a plurality of teeth that extend from the circumference of the chain rings 452. The teeth of the chain ring 452 engage a front chain 462, which is a continuous loop that engages the front hub 412a of the front wheel 404a. There may be more than one chain ring 452; for example, there may be two or three chain rings as commonly found on bicycles. A front derailleur (not shown) may be used to transfer the front chain 348 from one chain ring to another. The front hub 412a includes a freewheel (not shown) to allow the hub to spin freely when the mechanical advantage drive takes over.

The front chain 462 connects the chain ring 452 to a drive sprocket 454 attached to the front hub 412a on the right side of the tricycle 400. Alternately, a plurality of sprockets, generally collected and attached together as a cassette, may be attached to the front hub 412a to drive the front wheel 404a. The front chain 462 engages the teeth of the drive sprocket 454. If a cassette were used in place of the single drive sprocket 454, the front chain 462 may also be threaded through a derailleur (not shown) that moves the front chain 462 between the sprockets in the cassette.

A transfer ring 450 may also be attached to the right side of the spindle in the bottom bracket 416. The transfer ring 450 is also driven by the rider pushing the pedals 446. The transfer ring 450 is toothed about the circumference similar to the chain ring 452. A rear chain 464 engages the transfer ring 450 and extends rearward along the inside of the right bottom tube 424a as a continuous loop to drive the axle and the pulley hub 426 mounted between the junction of the right and left bottom tubes 424a, 424b and the rear down tubes 422a, 422b.

The rear chain 464 engages a pulley sprocket 456 fixed to the right side of the axle. Alternately, a plurality of sprockets, generally collected and attached together as a cassette, may be used in place of the single pulley sprocket 456. A derailleur may be attached to the junction of the rear down tubes 422a, 422b and the bottom tubes 424a, 424b and used to shift between the sprockets in the pulley cassette.

A pulley 458 mounted on the pulley hub 426, which rotates about the spindle to the left of the pulley sprocket 456. The pulley hub 426 has a freewheel (not shown), similar to standard freewheels on rear wheels of bicycles, mounted about the spindle. The freewheel is adapted to engage the spindle, thus turning the pulley hub 426 and the attached pulley 458 when the gearing is selected to engage the pulley 458. Alternately, the freewheel freely rotates about the spindle when the gearing is directly driving the front wheel 404a. The pulley 458 may thus be turned by rotational transfer from the pulley sprocket 456 to the pulley hub 426.

The circumference of the pulley 458 is toothed to engage a belt 466 that is used to additionally drive the front wheel 404a. A drive rim 460 is attached to the front rim 408a of the front wheel 404a. The drive rim 460 is toothed and engages the belt 466 driven by the pulley 458. Again, FIGS. 3 and 4 depict the construction of the drive rim in greater detail. The belt 466 may be made, for example, of reinforced rubber, toothed on one side for engaging the pulley 458 and drive rim 460 and flat on the other to minimize potential interference with the ground or collection of dirt and grit due to the close proximity of the belt 466 to the ground when traveling around the front wheel 404a. Note that since mechanical advantage drive system of the tricycle 400 drives the front wheel 404a, the belt 466 pulls on the front wheel 404a from the bottom in order to propel the tricycle 400 forward.

The freewheel in the pulley hub 426 allows the pulley 458 to spin freely as the front wheel 404a rotates the pulley 458 via the belt 466 faster than the gearing of the pulley sprocket 456 is rotated by the pull of the rear chain 464. The relationship between the gearing of the drive sprocket 454 and the pulley sprocket 456 is chosen such that the pulley 458 engages the front wheel 404a when the rear chain 464 rotates the pulley sprocket 456 at a faster speed than the front chain 462 rotates the drive sprocket 454. When the pulley 458 overtakes the drive sprocket 454 as the drive for the front wheel 402a, the freewheel in the front hub 412a spins freely. The front wheel 404a is at this point driven by the belt 466 through engagement with the drive rim 460.

The mechanical advantage achieved using the pulley 458 to drive the front wheel 402a of the tricycle 400 can be seen by comparing the configuration of the components of the tricycle 400 to the schematic diagram of the cycle 200 in FIG. 1. The belt 466 engaging the front wheel 402a about the drive rim 460 continuously passes a point adjacent to a surface on which the front wheel 202a of the tricycle 400 is in contact. Thus, an instantaneous fixed point on the belt 466 is continuously achieved. When the pulley 458 is engaged, a mechanical advantage is achieved through the combination of the instantaneous fixed end of the belt 466 and the force transfer across the pulley 458, thus decreasing the force required of the rider on the rear chain 464 to drive the belt 466 and move the tricycle 400 forward.

A front portion 501 of the frame 513 is formed about a bottom bracket 516, a front down tube 518, a seat tube 520, a pair of rear down tubes 522, a pair of front bottom tubes 524a, and a pair of rear bottom tubes 524b. The front down tube 518 and the rear down tubes 522 are each attached at one end to an upper portion of the seat tube 520. The lower end of the seat tube 520 is fixed to the bottom bracket 516. The rear bottom tubes 524b are attached at a first end to the bottom bracket 516 and at a second end to the lower ends of the rear down tubes 522. A pulley hub 526 rotates on an axle mounted between the junction of the rear bottom tubes 524b and the rear down tubes 522.

The lower end of the front down tube 518 connects with a front fork 514. The front bottom tubes 524a are connected at a first end to the bottom bracket 516 and extend forward to join the front fork 514 and connect with and support an axle 511 in the front hub 512a about which the front wheel 504a rotates.

A head tube 528 interfaces with the seat tube 520 allowing the seat tube 520 to turn on a bearing interface (not shown) within the head tube 528. The seat tube 520 extends through the head tube 528 to support a seat 530. A seat post (not shown) may fit within the seat tube 520 to allow the height of the seat to be adjusted. A backrest bracket 532 may be fixed to either the bottom of the seat 530 or the top of the seat post to hold a backrest 534 above and behind the seat 530 to support the back of a rider.

A pair of angled handlebar brackets 536 is fixed to the head tube 528. The handlebar brackets 536 extend rearward at angles toward the right and left sides of the tricycle 500, respectively. The handlebar brackets 536 form a triangle with the head tube 528 such that the two open ends of the angle are fixed to the head tube 528 and the vertex of the angle is attached to a handlebar 538.

The handlebar 538 may generally be a partial oval shape and extend from under the seat 530 to curve up adjacent to or over the lap of a rider when seated in the seat 530 from each side of the tricycle 500. The grips 539 of the handlebars 538 are available for easy grasping by the rider to steer the tricycle 500 and aid in the balance of the rider while on the tricycle 500. The head tube 528, handlebar 538, and handlebar brackets 536 function as the interface between the front portion 501 of the frame 513 and a rear portion 502 of the frame 513, connecting the rear wheels 504b to the rest of the tricycle 500.

As in the embodiment of FIGS. 5-9, this interface also functions as the steering mechanism for the tricycle 500. A pair of suspension brackets 540 may be flexibly or rotationally fixed to the handlebar 538 adjacent the handlebar brackets 536, although the suspension brackets 540 may be located elsewhere on the handlebar 538. In this implementation, each suspension bracket 540 comprises a plate to which a rear fork 544 is mounted. Each suspension bracket 540 that acts as a suspension for the rear portion 502 of the tricycle 500 and may include a spring resistance to further support the rear portion 502 of the tricycle 500. The rear wheels 504b are mounted to the rear forks 544 by the axle of each rear hub 512b.

The suspension brackets 540 are also attached to respective ends of a restraint chain 570 by pins 542. The suspension brackets 540 may have a downwardly extending flange to which the restraint chain 570 is attached. As previously described, such a flange can effectively lengthen the travel of the restraint chain 570 to augment the flexion of the joint 572 between the front portion 501 and rear portion 502 of the tricycle 500 and thus augment the turning ability of the tricycle 500.

The restraint chain 570 wraps around a head sprocket 568 that is mounted at the top of the head tube 528. The head sprocket 568 may be formed of a toothed sprocket mounted on a set of bearings that allow the head sprocket 568 to rotate around the head tube 528. In practice, the head sprocket 568 travels minimally as it is constrained by its engagement with the restraint chain 570. The weight of the tricycle 500 and the rider thereon push a joint 572 at the suspension brackets 540 against the restraint chain 570. The restraint chain 570 thus prevents the rear forks 544 from collapsing upward at the suspension brackets 540 under the weight. The restraint chain 570 does allow for slight flex and movement of the suspension brackets 540 during a turn.

The steering system of the tricycle 500 operates similarly to the steering system of the implementation shown in FIGS. 5-8, i.e., the tricycle 500 is steered by a combination of turning the seat tube 520 within the head tube 528 and flexing the joints 572 between the front portion 501 and rear portion 502 of the frame 513. The rider holds onto the handlebars 538 and, by shifting his body, the seat 530, attached seat post 520, and thus the entire front portion 501 of the frame 513 turn with respect to the head tube 528 and the attached rear portion 502 of the tricycle 500. Additionally, when a rider turns the front portion 501, the joint 572 between the front portion 501 and rear portion 502 of the frame 513 at the suspension brackets 540 bends to favor the direction of steering indicated by the rider, additionally causing the tricycle 500 to lean into the turn.

The mechanical advantage drive system for the tricycle 500 includes a pair of pedals 546 attached to a pair of crank arms 548 that extend from the bottom bracket 516. The crank arms 548 are attached to each end of a spindle (not shown) that rotates within the bottom bracket 516. A chain ring 552 is attached to the left side of the spindle. The chain ring 552 thus rotates with the spindle in the bottom bracket 516 as the rider pushes the pedals 546 in a circular motion.

The chain ring 552 has a plurality of teeth that extend from the circumference of the chain rings 552. The teeth of the chain ring 552 engage a front chain 562, which is a continuous loop that engages the front hub 512a to drive the front wheel 504a. There may be more than one chain ring 552; for example, there may be two or three chain rings as commonly found on bicycles. A front derailleur (not shown) may be used to transfer the front chain 348 from one chain ring to another. The front hub 512a includes a freewheel (not shown) to allow the hub to spin freely when the mechanical advantage drive takes over.

The front chain 562 connects the chain ring 552 to a plurality of sprockets, generally collected and attached together as a drive cassette 554 attached to the front hub 514 on the right side of the tricycle 500. Alternately, a single sprocket could be used instead of the drive cassette 554. The front chain 562 engages the teeth of the sprockets in the drive cassette 554. The front chain 562 is also threaded through a derailleur 555 that moves the front chain 562 between the sprockets in the drive cassette 554. Note that since the front wheel 502a is being driven, the front chain 562 pulls downward and rearward on the sprockets of the drive cassette 554, which is opposite the direction of pull by the chain on the sprockets on a standard bicycle. Therefore, if using a standard derailleur mechanism, the derailleur 555 is mounted upside down at the front hub 512a to provide tension to the slack in the upper portion of the front chain 562.

A transfer ring 550 may also be attached to the right side of the spindle in the bottom bracket 516. The transfer ring 550 is also driven by the rider pushing the pedals 546. The transfer ring 550 is toothed about the circumference similar to the chain ring 552. A rear chain 564 engages the transfer ring 550 and extends rearward along the inside of the rear bottom tubes 524b as a continuous loop to drive the pulley axle 527 and the pulley hub 526 mounted between the junction of the rear bottom tubes 524b and the rear down tubes 522.

The rear chain 564 engages a plurality of sprockets, generally collected and attached together as a pulley cassette 556 fixed to the right side of the pulley axle 527. Alternately, a single sprocket may be used in place of the pulley cassette 556. The rear chain 564 is threaded through a derailleur 557 attached to the junction of the rear down tubes 522 and the rear bottom tubes 524b, which is used to shift the rear chain 564 between the sprockets in the pulley cassette 556.

A pulley 558 mounted on the pulley hub 526 rotates about the spindle to the left of the pulley sprocket 556. The pulley hub 526 has a freewheel (not shown) adapted to engage the spindle, thus turning the pulley hub 526 and the attached pulley 558 when the gearing is selected to engage the pulley 558. Alternately, the freewheel freely rotates about the spindle when the gearing is directly driving the front wheel 504a. The pulley 558 may thus be turned by rotational transfer from the pulley sprocket 556 to the pulley hub 526.

The circumference of the pulley 558 is toothed to engage a belt 566 that is used to additionally drive the front wheel 502a. A drive rim 560 is attached to the front rim 508a of the front wheel 502a. The drive rim 560 is toothed and engages the belt 566 driven by the pulley 558. The relationship between the gearing of the drive system is similar to the description above with respect to FIGS. 5-8 and thus provides a mechanical advantage to the rider. It may also be desirable to mount a motor to the frame at one of multiple locations to alternately power the tricycle and take advantage of the mechanical advantage drive system to carry perhaps greater loads.

The above specification, examples, and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention. Other embodiments or implementations are therefore contemplated. It is intended that all matter contained in the above description and shown in the accompanying drawings shall be interpreted as illustrative only of particular embodiments and not limiting. Changes in detail or structure may be made without departing from the basic elements of the invention as defined in the following claims.

What is claimed is:

1. A tricycle with a leaning system comprising
a frame;
a front wheel rotationally attached to the frame;
a first rear wheel rotationally attached to the frame;
a second rear wheel rotationally attached to the frame;
a front portion attached to the front wheel, the front portion including a seat tube that supports a seat;
an interface portion rotationally attached to the front portion, the interface portion including:
a head tube through which the seat tube passes and within which the seat tube rotates; and
a handlebar attached to the head tube; and
a rear portion hinged to the interface portion and attached to both the first rear wheel and the second rear wheel, the rear portion further including
a first rear fork attached to the first rear wheel; and
a second rear fork attached to the second rear wheel, wherein
the first rear fork and the second rear fork are hinged to the handlebar.

2. The tricycle of claim 1 further comprising
a sprocket rotationally mounted around either the head tube or the seat tube; and
a third chain attached to the first rear fork at a first end, attached to the second rear fork at a second end, and engaged with the sprocket between the first end and the second end.

3. The tricycle of claim 1, wherein
the first rear fork and the second rear fork each further comprise a flange extending downward from a position adjacent the hinge with the handlebar; and
the first end of third chain and the second end of the third chain are attached to the respective flange.

4. The tricycle of claim 1, wherein the seat is supported by the seat tube above the head tube.

5. The tricycle of claim 1, wherein the handlebar extends upward from below the seat on each side of the seat.

6. A cycle with a leaning steering system comprising
a frame;
a front wheel rotationally attached to the frame;
a first and second rear wheel rotationally attached to the frame;
a front portion attached to the front wheel, the front portion including a seat tube that supports a seat;
an interface portion rotationally attached to the front portion, the interface portion including
a head tube through which the seat tube passes and within which the seat tube rotates; and
including a handlebar attached to the head tube; and
a rear portion hinged to the interface portion and attached to the rear wheels, the rear portion further including
a first rear fork attached to the first rear wheel; and
a second rear fork attached to the second rear wheel, wherein
the first rear fork and the second rear fork are hinged to the handlebar.

7. The cycle of claim 6, wherein the seat is supported by the seat tube above the head tube.

8. The cycle of claim 6, wherein the handlebar extends upward from below the seat on each side of the seat.

* * * * *